(12) United States Patent
Jiang

(10) Patent No.: US 10,664,042 B2
(45) Date of Patent: May 26, 2020

(54) HOUSING AND VIRTUAL REALITY GLASSES INCLUDING THE SAME

(71) Applicant: Beijing Xiaomi Mobile Software Co., Ltd., Beijing (CN)

(72) Inventor: Hao Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/947,042

(22) Filed: Apr. 6, 2018

(65) Prior Publication Data

US 2018/0292889 A1   Oct. 11, 2018

(30) Foreign Application Priority Data

Apr. 10, 2017   (CN) .......................... 2017 1 0230302

(51) Int. Cl.
*G02B 27/01*  (2006.01)
*G06F 3/01*  (2006.01)
*G06F 1/16*  (2006.01)

(52) U.S. Cl.
CPC ............ *G06F 3/011* (2013.01); *G02B 27/017* (2013.01); *G02B 27/0176* (2013.01); *G06F 1/1601* (2013.01); *G02B 2027/0178* (2013.01)

(58) Field of Classification Search
CPC ........... G02B 27/017–0176; G02B 2027/0178; G06F 3/011–3/015
See application file for complete search history.

(56) References Cited

U.S. PATENT DOCUMENTS

| | | | | |
|---|---|---|---|---|
| 6,069,608 A | * | 5/2000 | Izumi .................. | G02B 27/017 345/619 |
| 6,538,624 B1 | * | 3/2003 | Karasawa .......... | G02B 27/0176 345/8 |
| 2010/0079356 A1 | * | 4/2010 | Hoellwarth ......... | G02B 27/017 345/8 |
| 2016/0062514 A1 | * | 3/2016 | Jo ........................ | G02B 27/017 345/174 |
| 2018/0032101 A1 | | 2/2018 | Jiang | |

FOREIGN PATENT DOCUMENTS

| | | |
|---|---|---|
| CN | 205123824 U | 3/2016 |
| CN | 106019597 A | 10/2016 |
| CN | 205958839 U | 2/2017 |
| CN | 205992089 U | 3/2017 |
| EP | 2388714 A1 | 11/2011 |
| EP | 3276398 A1 | 1/2018 |
| WO | 2016087686 A1 | 6/2016 |

OTHER PUBLICATIONS

European Extended Search Report issued in EP Patent Application No. 18166061.4, dated Jul. 30, 2018, 8 pages.

* cited by examiner

*Primary Examiner* — Hang Lin
(74) *Attorney, Agent, or Firm* — Arch & Lake LLP

(57) ABSTRACT

A housing and virtual reality glasses including the housing are provided. The virtual reality glasses include a housing provided with a plurality of body heat dissipation holes. The body heat dissipation holes ventilate internal space of the housing with external space of the housing. By providing heat dissipation holes on the housing of the virtual reality glasses, heat generated from the internal space of the virtual reality glasses in operation may be conducted outward.

20 Claims, 3 Drawing Sheets

HOUSING AND VIRTUAL REALITY GLASSES INCLUDING THE SAME

CROSS-REFERENCE TO RELATED APPLICATION

This application is based upon and claims priority to Chinese patent application No. 201710230302.1, filed Apr. 10, 2017, which is incorporated herein by reference in its entirety.

TECHNICAL FIELD

The present disclosure relates to the technical field of virtual reality, and more particularly, to a housing, and virtual reality glasses including the housing.

BACKGROUND

Virtual Reality (VR) technology is a kind of computer-based simulation system, which can generate a simulation environment and provide user with an immersive experience through three-dimensional dynamic scenes and physical interaction.

In the related art, virtual reality glasses are generally cooperated with a mobile phone, a tablet or other electronic device of a user, to calculate, process and play virtual reality contents provided by the mobile phone, the tablet or other electronic device. However, since the functional components for performing calculation, processing and playing, the mobile phone, the tablet or other electronic device cooperated with the virtual reality glasses may generate heat during operation, and no effective heat dissipation structure is provided in the related art. Accordingly, the functional components of the virtual reality glasses might be damaged because of the heat, and the comfort felt by the user in usage of the virtual reality glasses might be affected.

SUMMARY

In order to overcome the problem of the related art, embodiments of the present disclosure provides virtual reality glasses which facilitate heat dissipation.

In a first aspect, the present disclosure provides virtual reality glasses cooperated with an electronic device for playing virtual reality contents. The virtual reality glasses include a housing, where the housing is provided with a plurality of heat dissipation holes, and the heat dissipation holes ventilate internal space of the housing with external space of the housing.

In a second aspect, a housing is provided for a virtual reality device. The housing includes a body defining an internal space and at least partially enclosing the internal space. The body includes a plurality of body heat dissipation holes, and the body heat dissipation holes ventilate internal space of the housing with external space of the housing.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
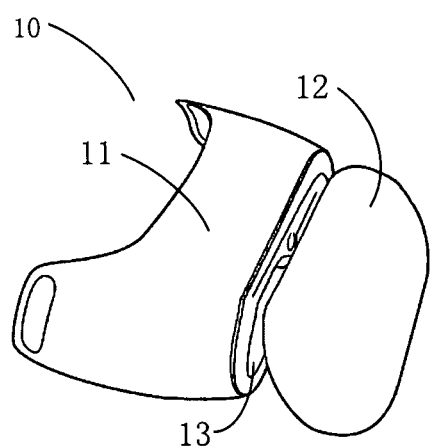
FIG. 1 is a schematic structural diagram illustrating virtual reality glasses in the related art.

FIG. 1 is a schematic structural diagram illustrating virtual reality glasses in the related art. As shown in FIG. 1, generally, a virtual reality device may be virtual reality glasses that include a housing 10. The housing 10 has an installation space 13 therein. Functional components for implementing the virtual reality function are installed inside the installation space 13. When the virtual reality glasses are formed as an integral piece, the functional components may include a display component fixedly installed in the installation space 13. Generally, the functional components generate heat during operation. In addition, the virtual reality glasses may be formed as separate parts, that is, the virtual reality glasses may be cooperated with an electronic device such as a mobile phone assembled between the body 11 and cover 12 of the virtual reality glasses. The electronic device may also generate heat during operation. In the related art, the heat may be mainly dissipated slowly through heat exchange with air. The slow heat dissipation will cause accumulation of heat, which may not only damage the functional components of the virtual reality glasses, but also lower user experience in usage of the virtual reality glasses.

The present disclosure provides an improvement to the structure of the virtual reality glasses, to solve the above technical problem in the related art. The detailed description is given below with reference to the drawings.

Figure 2:
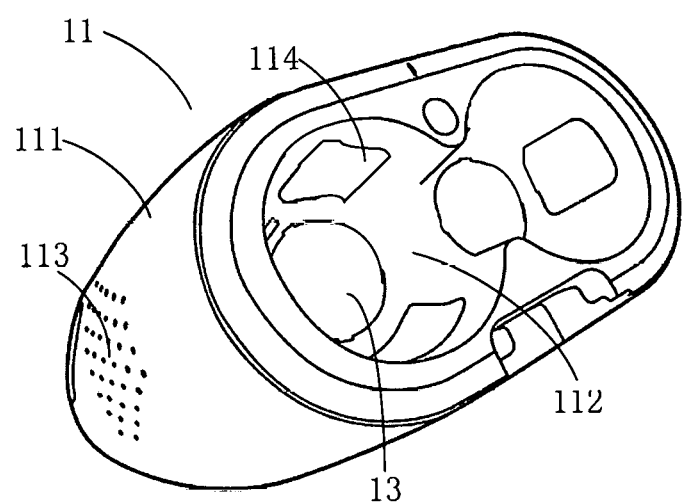
FIG. 2 is a schematic structural diagram illustrating a housing of the virtual reality glasses according to an aspect of the present disclosure.

FIG. 2 is a schematic structural diagram illustrating a housing 10 of the virtual reality glasses according to an aspect of the present disclosure. As shown in FIG. 2, the virtual reality glasses may include a housing provided with a plurality of body heat dissipation holes 113. The body heat dissipation holes 113 ventilate the internal space of the housing 10 with the external space of the housing 10. By providing the body heat dissipation holes 113 on the housing 10 of the virtual reality glasses, heat generated from the internal space of the virtual reality glasses in operation may be conducted outward. Therefore, it may avoid damaging the virtual reality glasses due to the heat accumulation inside, which may also improve user experience.

In the embodiment, the housing 10 may include a body 11. The internal space of the housing 10 may include the installation space 13 inside the body 11. The installation space 13 is configured for installing optical components of the virtual reality glasses. The outer surface 111 of the body 11 is provided thereon with body heat dissipation holes 113, which are communicating with the installation space 13. The inner surface 112 of the body 11 is provided thereon with a body heat guiding member 114. The body heat guiding member 114 is communicating with the body heat dissipation holes 113. The body heat guiding member 114 may be a recess on the inner surface 112 of the body 11. The recess establishes a channel for dissipating the heat in the installation space 13 inside the body 11, such that air convection may be easily formed inside the installation space 13, to guide the heat in the installation space 13 to the body heat dissipation holes 113. In addition, the recess may reduce the weight of the housing 10, further improving user experience in wearing the virtual reality glasses.

Figure 3:
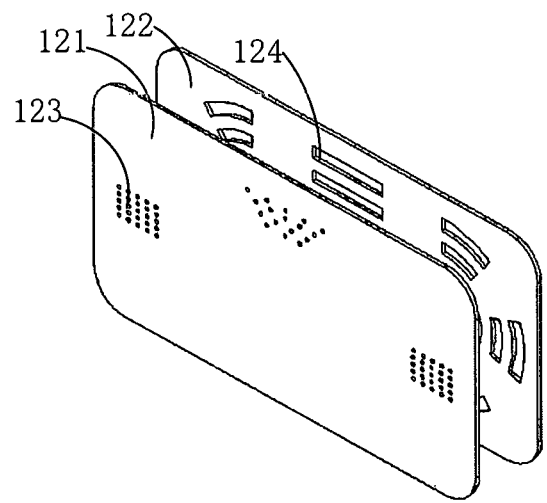
FIG. 3 is a schematic structural diagram illustrating a housing of the virtual reality glasses according to another aspect of the present disclosure.
Figure 4:
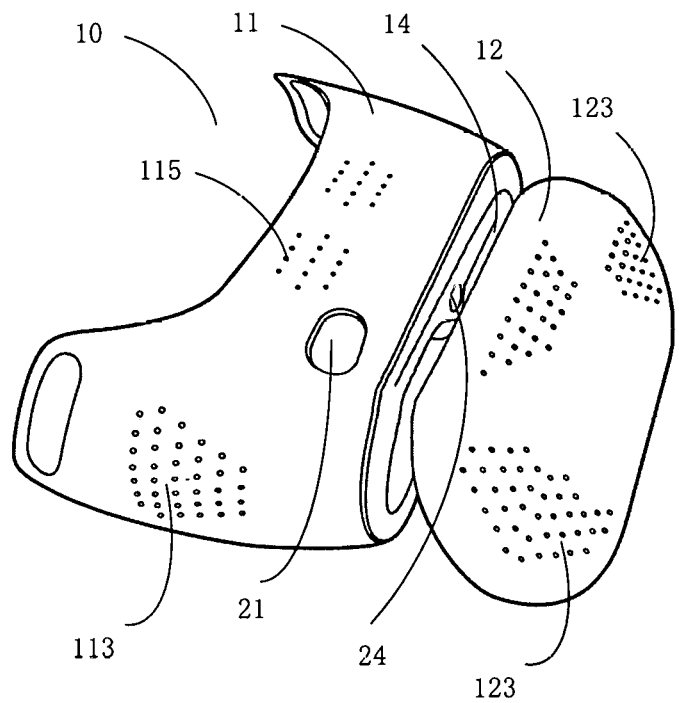
FIG. 4 is a schematic structural diagram illustrating a housing of the virtual reality glasses according to yet another aspect of the present disclosure.

FIG. 3 is a schematic structural diagram illustrating a housing 10 of the virtual reality glasses according to another aspect of the present disclosure. FIG. 4 is a schematic structural diagram illustrating a housing 10 of the virtual reality glasses according to yet another aspect of the present disclosure. In the example of FIG. 4, the housing 10 includes a first plurality of body dissipation holes 113 on the side surface of the housing 10. The housing 10 also includes a second plurality of body dissipation holes 115 on the upper surface of the housing 10. Although invisible in FIG. 4, the housing 10 may further include a third plurality of body dissipation holes 113 on the other side surface of the housing 10.

As shown in FIGS. 3 and 4, the virtual reality glasses may be cooperated with an electronic device for playing virtual reality contents. The above housing 10 may also include a cover 12 assembled at a distal side of the body 11. The internal space of the housing 10 may also include an accommodation space 14 formed between the cover 12 and the body 11. The accommodation space 14 is for accommodating the electronic device. Further, the above cover 12 may also include an outer cover body 121 and an inner cover body 122 which may be assembled together. The cover heat dissipation holes 123 are disposed on the outer cover body 121, and the cover heat guiding member 124 is disposed on the inner cover body 122. The cover heat guiding member 124 may be a group of channel holes provided on the inner cover body 122. The group of channel holes establishes channels for dissipating heat inside the accommodation space 14, to guide the heat in the accommodation space 14 to the cover heat dissipating holes 123.

Figure 5:
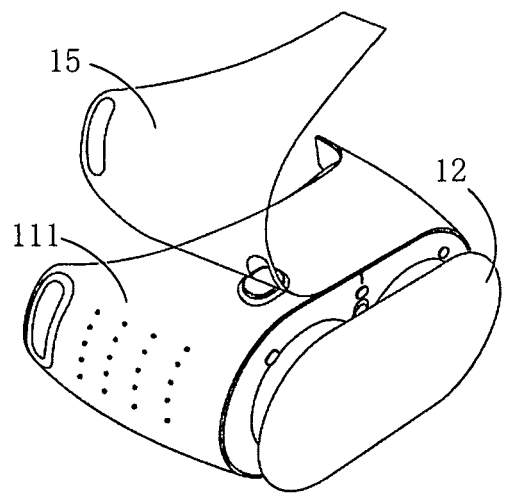
FIG. 5 is a schematic structural diagram illustrating virtual reality glasses according to an aspect of the present disclosure.

FIG. 5 is a schematic structural diagram illustrating virtual reality glasses according to an aspect of the present disclosure. As shown in FIG. 5, the outer surface 111 of the housing 10 is adhered with a light shielding layer 15 fitted with the plurality of heat dissipating holes. This may prevent external light from entering the inside of the virtual reality glasses and affecting the visual effect of the virtual reality playing. Moreover, it may also improve the overall aesthetics of the virtual reality glasses. The material of the light shielding layer 15 may be polyester, lycra or cotton, especially material which has characteristics of both shielding light and air permeability. However, this is not limited by the present disclosure.

Figure 6:
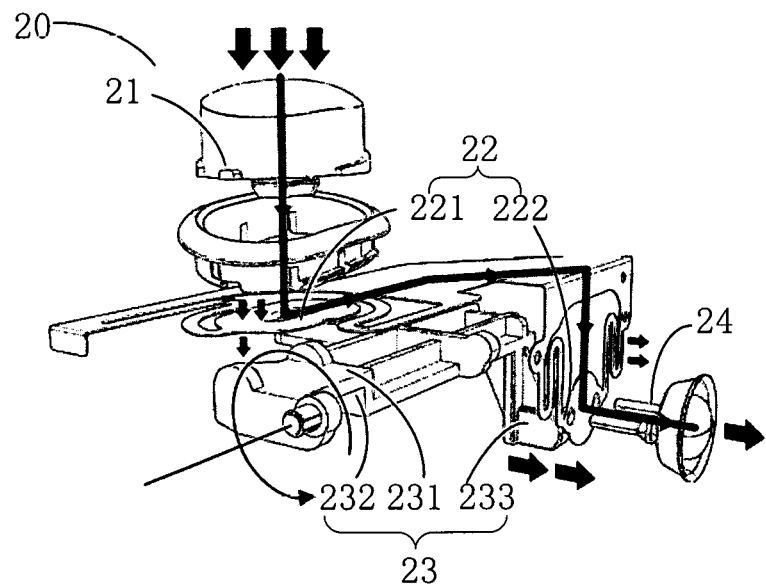
FIG. 6 is a schematic structural diagram illustrating a control component of the virtual reality glasses according to another aspect of the present disclosure.

FIG. 6 is a schematic structural diagram illustrating a control component 20 of the virtual reality glasses according to another aspect of the present disclosure. As shown in FIG. 6, the virtual reality glasses may be cooperated with an electronic device for playing virtual reality contents. Therefore, the virtual reality contents may also include a control component 20 disposed inside the housing 10. In this case, playing virtual reality contents and other functions of the electronic device may be controlled by the control component 20 disposed inside the housing 10 of the virtual reality glasses. It should be noted that the control component 20 may be applied with a force in a direction as shown by black arrows in FIG. 6. The grey arrows show the current direction in the control component.

The control component 20 includes a first triggering member 21, a second triggering member 24, a guiding member 22, and a conducting member 23. The guiding member 22 includes a first elastic terminal 221 and a second elastic terminal 222. The conducting member 23 includes a rotating portion 232 and a first contacting portion 231 and a second contacting portion 233 which are both connected to the rotating portion 232. When a triggering operation occurs, the first triggering member 21 contacts the first elastic terminal 221 and pushes the first elastic terminal 221 such that the first elastic terminal 221 is deformed. The first elastic terminal 221 pushes against the first contacting portion 231 such that the rotating portion 232 rotates around a preset rotation axis. The second contacting portion 233 cooperates with the second elastic terminal 222, such that the second elastic terminal 222 is deformed and pushes the second triggering member 24 to contact the screen of the electronic device, so as to implement manipulating of the electronic device. When the triggering operation ceases, the first elastic terminal 221 is restored from deformation, such that the first elastic terminal 221 returns and is disengaged from the first triggering member 21. The second elastic terminal 222 is restored from deformation, such that the second elastic terminal 222 returns and is disengaged from the second triggering member 24, to be prepared for the next operation.

It should be noted that, the first triggering member 21, the second triggering member 24, and the guiding member 22 may be made of electrically conductive material. The first triggering member 21 and the second triggering member 24 may be made of conductive silica gel. This is not limited by the present disclosure. The guiding member 22 may be made of metal material, or other electrically conductive material, which is not limited by the present disclosure.

Optionally, the housing includes a body, the internal space of the housing includes an installation space inside the body, the installation space is for installing optical components of the virtual reality glasses, and the body is provided thereon with body heat dissipation holes communicating with the installation space. In this way, the heat generated by the optical components in the installation space in operation may be dissipated.

Optionally, the body includes therein a body heat guiding member disposed inside the installation space, and the body heat guiding member is configured to guide heat from the installation space to the body heat dissipation holes.

Optionally, the body heat dissipation holes are disposed on an outer surface of the body, the body heat guiding member is disposed on an inner surface of the body, and the body heat guiding member is communicating with the body heat dissipation holes.

Optionally, the body heat guiding member is a recess provided on the inner surface of the body. In this way, a heat dissipating channel may be established, and the weight of the housing may be reduced, further improving user experience in wearing the virtual reality glasses.

Optionally, the housing also includes a cover assembled at a distal side of the body, the internal space of the housing also includes an accommodation space formed between the cover and the body, the accommodation space is configured to accommodate the electronic device, and the cover is provided thereon with cover heat dissipation holes communicating with the accommodation space. In this way, heat generated by the electronic device in the accommodation space in operation may be dissipated.

Optionally, the cover includes an outer cover body and an inner cover body assembled together, the cover heat dissipation holes are disposed on the outer cover body, a cover heat guiding member is disposed on the inner cover body, and the cover heat guiding member is configured to guide heat from the accommodation space to the cover heat dissipation holes.

Optionally, the cover heat guiding member is a group of channel holes provided on the inner cover body. In this way, a heat dissipating channel may be established, and the weight of the housing may be reduced, further improving user experience in wearing the virtual reality glasses.

Optionally, the outer surface of the housing is adhered with a light shielding layer fitted with the plurality of heat dissipating holes. In this way, it may prevent external light from entering the inside of the virtual reality glasses and affecting the visual effect of the virtual reality playing. Moreover, it may also improve the overall aesthetics of the virtual reality glasses.

Optionally, the virtual reality glasses also include a control component disposed inside the housing. The control component may include: a first triggering member, a second triggering member, a guiding member and a conducting member, the first triggering member, the second triggering member, and the guiding member are made of electrically conductive material. The guiding member includes a first elastic terminal and a second elastic terminal. The conducting member includes a rotating portion and a first contacting portion and a second contacting portion both connected to the rotating portion.

When a triggering operation occurs, the first triggering member contacts the first elastic terminal and pushes the first elastic terminal such that the first elastic terminal is deformed; the first elastic terminal pushes against the first contacting portion such that the rotating portion rotates around a preset rotation axis; the second contacting portion cooperates with the second elastic terminal, such that the second elastic terminal is deformed and pushes the second triggering member to contact the electronic device; when the triggering operation ceases, the first elastic terminal is restored from deformation, such that the first elastic terminal returns and is disengaged from the first triggering member; the second elastic terminal is restored from deformation, such that the second elastic terminal returns and is disengaged from the second triggering member.

The above control component may control the electronic device to play the virtual reality contents and perform other functions.

Optionally, the first triggering member and the second triggering member are made of conductive silica gel.

Optionally, the guiding member is made of metal material.

The technical solution of the embodiment of the present disclosure may bring about the following advantageous effect. It may be seen from the above embodiment, in the present disclosure, by providing body heat dissipation holes on the housing of the virtual reality glasses, heat generated by the functional components of the virtual reality glasses and the electronic device cooperated with the virtual reality glasses in operation may be conducted outward from the internal space of the virtual reality glasses. Therefore, it may avoid damaging the virtual reality glasses due to the heat accumulation inside, which also improves user experience.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. Virtual reality glasses cooperated with an electronic device for playing virtual reality contents, comprising:
    a housing defining an internal space and at least partially enclosing the internal space,
    wherein the housing comprises a plurality of body heat dissipation holes, and the body heat dissipation holes ventilate internal space of the housing with external space of the housing;
    a control component disposed inside the housing, wherein the control component comprises a first triggering member, a second triggering member, a guiding member, and a conducting member, the first triggering member, the second triggering member, and the guiding member are made of electrically conductive material,
    wherein the guiding member comprises a first elastic terminal and a second elastic terminal, and the conducting member comprises a rotating portion, a first contacting portion and a second contacting portion, and both the first contacting portion and the second contacting portion are connected to the rotating portion;
    wherein in response to a triggering operation, the first triggering member contacts the first elastic terminal and pushes the first elastic terminal such that the first elastic terminal is deformed; the first elastic terminal pushes against the first contacting portion such that the rotating portion rotates around a preset rotation axis; in response to the rotation of the rotating portion, the second contacting portion cooperates with the second elastic terminal, such that the second elastic terminal is deformed and pushes the second triggering member to contact the electronic device.

2. The virtual reality glasses of claim 1, wherein the housing comprises a body, the internal space of the housing comprises an installation space inside the body, the installation space is configured to install optical components of the virtual reality glasses, and the body is provided thereon with the body heat dissipation holes communicating with the installation space.

3. The virtual reality glasses of claim 2, wherein the body comprises therein a body heat guiding member disposed inside the installation space, and the body heat guiding member is configured to guide heat from the installation space to the body heat dissipation holes.

4. The virtual reality glasses of claim 3, wherein the body heat dissipation holes are disposed on an outer surface of the body, the body heat guiding member is disposed on an inner surface of the body, and the body heat guiding member is communicating with the body heat dissipation holes.

5. The virtual reality glasses of claim 3, wherein the body heat guiding member is a recess provided on the inner surface of the body.

6. The virtual reality glasses of claim 2, wherein the housing further comprises a cover assembled at a distal side of the body, the internal space of the housing further comprises an accommodation space formed between the cover and the body, the accommodation space is configured to accommodate the electronic device, and the cover is provided thereon with cover heat dissipation holes communicating with the accommodation space.

7. The virtual reality glasses of claim 6, wherein the cover comprises an outer cover body and an inner cover body assembled together, the cover heat dissipation holes are disposed on the outer cover body, a cover heat guiding member is disposed on the inner cover body, and the cover heat guiding member is configured to guide heat from the accommodation space to the cover heat dissipation holes.

8. The virtual reality glasses of claim 7, wherein the cover heat guiding member comprises a group of channel holes provided on the inner cover body.

9. The virtual reality glasses of claim 4, wherein the outer surface of the housing is adhered with a light shielding layer fitted with the plurality of heat dissipating holes.

10. The virtual reality glasses of claim 4,
wherein the first triggering member is disposed on the outer surface of the body.

11. The virtual reality glasses of claim 10,
wherein when the triggering operation ceases, the first elastic terminal is restored from deformation, such that the first elastic terminal returns and is disengaged from the first triggering member; the second elastic terminal is restored from deformation, such that the second elastic terminal returns and is disengaged from the second triggering member.

12. The virtual reality glasses of claim 11, wherein the first triggering member and the second triggering member are made of conductive silica gel.

13. The virtual reality glasses of claim 11, wherein the guiding member is made of metal material.

14. A housing for a virtual reality device cooperated with an electronic device for playing virtual reality contents, the housing comprising:
a body defining an internal space and at least partially enclosing the internal space,
wherein the body comprises a plurality of body heat dissipation holes, and the body heat dissipation holes ventilate internal space of the housing with external space of the housing;
a control component disposed inside the housing, wherein the control component comprises a first triggering member, a second triggering member, a guiding member, and a conducting member, the first triggering member, the second triggering member, and the guiding member are made of electrically conductive material, and the first triggering member is disposed on an outer surface of the body,
wherein the guiding member comprises a first elastic terminal and a second elastic terminal, and the conducting member comprises a rotating portion, a first contacting portion and a second contacting portion, and both the first contacting portion and the second contacting portion are connected to the rotating portion;
wherein in response to a triggering operation, the first triggering member contacts the first elastic terminal and pushes the first elastic terminal such that the first elastic terminal is deformed; the first elastic terminal pushes against the first contacting portion such that the rotating portion rotates around a preset rotation axis; in response to the rotation of the rotating portion, the second contacting portion cooperates with the second elastic terminal, such that the second elastic terminal is deformed and pushes the second triggering member to contact the electronic device.

15. The housing of claim 14, wherein the internal space of the housing comprises an installation space inside the body, the installation space is configured to install optical components of the virtual reality device, and the body heat dissipation holes communicating with the installation space.

16. The housing of claim 15, wherein the body comprises therein a body heat guiding member disposed inside the installation space, and the body heat guiding member is configured to guide heat from the installation space to the body heat dissipation holes.

17. The housing of claim 16, wherein the body heat dissipation holes are disposed on an outer surface of the body, the body heat guiding member is disposed on an inner surface of the body, and the body heat guiding member is communicating with the body heat dissipation holes.

18. The housing of claim 16, wherein the body heat guiding member is a recess provided on the inner surface of the body.

19. The housing of claim 15, wherein the housing further comprises a cover assembled at a distal side of the body, the internal space of the housing further comprises an accommodation space formed between the cover and the body, the accommodation space is configured to accommodate the electronic device, and the cover is provided thereon with cover heat dissipation holes communicating with the accommodation space.

20. The housing of claim 19, wherein the cover comprises an outer cover body and an inner cover body assembled together, the cover heat dissipation holes are disposed on the outer cover body, a cover heat guiding member is disposed on the inner cover body, and the cover heat guiding member is configured to guide heat from the accommodation space to the cover heat dissipation holes.

* * * * *